US012738524B2

(12) United States Patent
Keitsch et al.

(10) Patent No.: US 12,738,524 B2
(45) Date of Patent: Sep. 15, 2026

(54) FUEL CELL STACK HAVING CASTING MATERIAL AND METHOD FOR PRODUCING A FUEL CELL STACK

(71) Applicant: Audi AG, Ingolstadt (DE)

(72) Inventors: Oliver Keitsch, Heilbronn (DE); Armin Siebel, Neckarsulm (DE); Sebastian Voigt, Heilbronn (DE)

(73) Assignee: AUDI AG, Ingolstadt (DE)

( * ) Notice: Subject to any disclaimer, the term of this patent is extended or adjusted under 35 U.S.C. 154(b) by 523 days.

(21) Appl. No.: 18/005,563

(22) PCT Filed: Oct. 25, 2021

(86) PCT No.: PCT/EP2021/079523
§ 371 (c)(1),
(2) Date: Jan. 13, 2023

(87) PCT Pub. No.: WO2022/090145
PCT Pub. Date: May 5, 2022

(65) Prior Publication Data
US 2023/0275252 A1 Aug. 31, 2023

(30) Foreign Application Priority Data
Oct. 30, 2020 (DE) ..................... 10 2020 128 557.4

(51) Int. Cl.
*H01M 8/2465* (2016.01)
*H01M 8/0258* (2016.01)
(Continued)

(52) U.S. Cl.
CPC ....... *H01M 8/2465* (2013.01); *H01M 8/0258* (2013.01); *H01M 8/0271* (2013.01);
(Continued)

(58) Field of Classification Search
CPC ............. H01M 8/0258; H01M 8/0271; H01M 8/1004; H01M 8/2465; H01M 8/248; H01M 2008/1095
See application file for complete search history.

(56) References Cited

U.S. PATENT DOCUMENTS

2009/0130530 A1 5/2009 Tanaka
2016/0141638 A1* 5/2016 Sato .................... H01M 8/0256 429/514

FOREIGN PATENT DOCUMENTS

DE 102005045184 B4 12/2010
DE 102010011206 * 9/2011
(Continued)

OTHER PUBLICATIONS

English translation of DE Publication 102015201408, Jul. 2016.*
(Continued)

*Primary Examiner* — Brittany L Raymond
(74) *Attorney, Agent, or Firm* — Seed Intellectual Property Law Group LLP

(57) ABSTRACT

A fuel cell stack comprises a cell series composed of multiple unit cells, being formed with internal media guides in the cell, and contained between two clamped together end plates in a fuel cell stack housing. The cell series present in the fuel cell stack housing is embedded entirely in an electrically insulating casting material. A method for producing a fuel cell stack is also provided.

12 Claims, 2 Drawing Sheets

(51) Int. Cl.

| | |
|---|---|
| ***H01M 8/0271*** | (2016.01) |
| ***H01M 8/10*** | (2016.01) |
| ***H01M 8/1004*** | (2016.01) |
| ***H01M 8/248*** | (2016.01) |

(52) U.S. Cl.

CPC ......... *H01M 8/1004* (2013.01); *H01M 8/248* (2013.01); *H01M 2008/1095* (2013.01)

(56) References Cited

FOREIGN PATENT DOCUMENTS

| | | | | |
|---|---|---|---|---|
| DE | 102010011206 | A1 | | 9/2011 |
| DE | 112004001748 | B4 | | 4/2014 |
| DE | 102015201408 | | * | 7/2016 |
| EP | 0897196 | A1 | | 2/1999 |
| EP | 0951086 | A2 | | 10/1999 |

OTHER PUBLICATIONS

English translation of DE Publication 102010011206, Sep. 2011.*

International Search Report, mailed May 2, 2022, for International Patent Application No. PCT/EP2021/079523. (2 pages).

Written Opinion of the International Searching Authority, dated May 2, 2022, for International Patent Application No. PCT/EP2021/079523. (5 pages).

* cited by examiner

FUEL CELL STACK HAVING CASTING MATERIAL AND METHOD FOR PRODUCING A FUEL CELL STACK

BACKGROUND

Technical Field

Embodiments of the invention relate to a fuel cell stack having a cell series composed of multiple unit cells, being formed with internal media guides in the cell, and contained between two clamped together end plates in a fuel cell stack housing. Embodiments of the invention further relate to a method for producing a fuel cell stack.

Description of the Related Art

Fuel cells serve for providing electric energy by an electrochemical reaction, while multiple fuel cells can be switched together in series to form a fuel cell stack in order to increase the useful power. Each of the fuel cells comprises an anode, a cathode, as well as a proton-conducting membrane separating the anode from the cathode, being coated with a catalyst in order to promote the electrochemical reaction. Furthermore, bipolar plates are provided on both sides of the membrane in a fuel cell stack in order to supply each fuel cell with the reactants and possibly also with a coolant. Moreover, gas diffusion layers are employed in order to distribute the reactants brought into the bipolar plates as uniformly as possible over the entire surface of the membrane coated with the catalyst.

This plurality of fuel cells assembled into a fuel cell stack is generally pressed together with the aid of tension elements have a force in the range of several kilonewton, in order to achieve an adequate contact pressure on the catalyst-coated membrane so as to reduce ohmic losses and to prevent leakage of the seals installed by means of the high pressing force.

A fuel cell stack is formed by alternate stacking of bipolar plates and membrane electrode assemblies (MEAs), known together as a unit cell, thereby forming a cell series. In order to prevent media from getting into or out from the stack, a polymer seal is placed either on the surface of the bipolar plates or on the surface of the MEA, being compressed by the closing pressure force of the cell series with the aid of a clamping system and thereby providing the sealing action.

EP 0 897 196 A1 shows a method for producing an insulating component for a high-temperature fuel cell. From DE 11 2004 001 748 B4 there is known a method for producing a fuel cell arrangement, the fuel cell arrangement being cast with a sealing means. A method for producing a fuel cell stack in which sealing is provided by means of an electrically insulating casting compound is shown in DE 10 2010 011 206 A1. An encasing or casting of the fuel cell with the insulating component is not disclosed.

One problem with known seals is their permeability to hydrogen, making necessary a continual ventilation of the stack housing. Furthermore, the loss of hydrogen from the stack can mean that, when the fuel cell system is started once more, air will be present at the anode side (so-called air/air start), which results in significant damage to the fuel cell.

BRIEF SUMMARY

Some embodiments provide a fuel cell stack having an improved tightness. Some embodiments provide an improved method for producing such a fuel cell stack.

In some embodiments, a fuel cell stack is characterized in that the cell series present in the fuel cell stack housing is embedded entirely in an electrically insulating casting material. The cell series is sealed off in regard to a gas exchange because the loss of hydrogen from the stack is slowed down and in addition the cavities present in the fuel cell stack housing are reduced, while the penetration of air into the fuel cell stack is prevented or at least drastically reduced.

In some embodiments, the casting material is braced against the fuel cell stack. The encasing in suitable material can also improve the mechanical stability of the cell series, since the force of adhesion of the cells to each other is no longer due solely to the seal, but also the cell series is braced against the housing. In general, materials with a very low $H_2$ permeation or gas permeation may be advantageous, since these afford a more secure sealing against hydrogen and other gaseous media.

In order to positively influence the electrical creepage distance, it may be advantageous for the unit cells to comprise a membrane electrode assembly received between two bipolar plates, and for a lateral overhang to be provided, being formed on the membrane electrode assembly, on a frame encasing the membrane electrode assembly, or on a seal laterally encompassing the membrane electrode assembly.

The thickness of the cast layer can be chosen such that the remaining gas volume inside the stack housing is reduced so much that any ventilation of stack housing is unnecessary, while heeding and complying with the hydrogen safety regulations and standards. It may be advantageous for the overhang to be completely embedded in the casting material.

Alternatively or also additionally, it is possible for the overhang to be only partly embedded in the casting material. In another embodiment, the thickness of the casting layer can be reduced and/or the overhang of the MEA enlarged in order to positively influence the electrical creepage distances. This embodiment further reduces the weight of the fuel cell stack.

In addition to sealing the cell series in regard to a gas exchange, the fuel cell stack housing is closed air-tight, any cavities present in the fuel cell stack housing being reduced by the casting material which is present.

It is possible for the fuel cell stack housing to not feature a fan, so that any ventilating of the fuel cell stack housing is unnecessary.

Moreover, it may be advantageous for at least one of the end plates to be provided with all the connections for supplying the unit cells with the operating media, which are fluidically connected to the internal media guides of the cell. In this way, the media are all conducted into and also out from the fuel cell stack at the identical side, which affords benefits for the utilization of the design space available in a motor vehicle.

The benefits and embodiments explained in connection with the fuel cell stack described herein hold equally for the method described herein. This involves the step of stacking of unit cells made from bipolar plates with membrane electrode assemblies situated between them, being provided with internal media guides in the cell, to form a cell series, the step of clamping the stacked unit cells between two end plates in a fuel cell stack housing, and the step of casting the cell series in an electrically insulating casting material, braced against the fuel cell stack housing.

The features and combinations of features mentioned above in the description as well as the features and combinations of features mentioned below in the description of the figures and/or shown solely in the figures can be used not only in the particular indicated combination, but also in other combinations or standing alone. Thus, embodiments not shown or explained explicitly in the figures, yet deriving and producible from the explained embodiments by separated combinations of features shall also be deemed to be encompassed and disclosed by the present disclosure.

BRIEF DESCRIPTION OF THE SEVERAL VIEWS OF THE DRAWINGS

Further benefits, features and details will emerge from the claims, the following description of embodiments, and the drawings.

DETAILED DESCRIPTION

Figure 1:
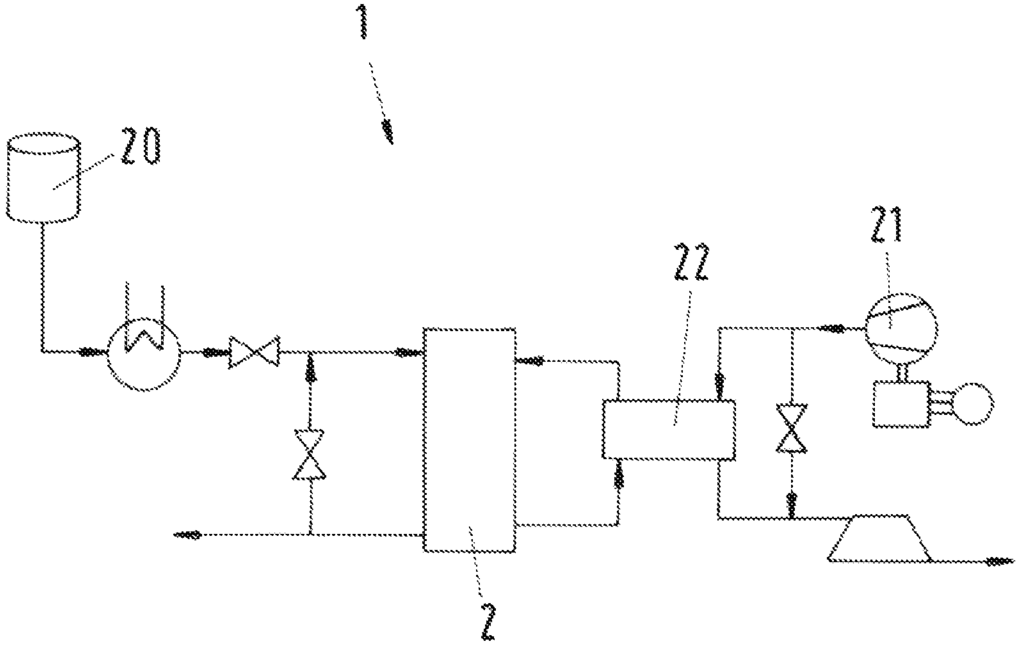
FIG. 1 shows a schematic representation of a fuel cell device.

FIG. 1 shows schematically a fuel cell device 1, comprising a fuel cell stack 2 consisting of a plurality of fuel cells hooked up in series. This fuel cell device 1 can in particular be part of a fuel cell vehicle, not otherwise shown.

Each of the fuel cells comprises an anode and a cathode as well as a proton-conducting membrane separating the anode from the cathode. The membrane is formed from an ionomer, such as a sulfonated tetrafluoroethylene polymer (PTFE) or a polymer of perfluorinated sulfonic acid (PFSA). Alternatively, the membrane can be formed as a sulfonated hydrocarbon membrane.

Through anode spaces inside the fuel cell stack 2, fuel is supplied to the anodes (for example, hydrogen) from a fuel tank 20. In a polymer electrolyte membrane fuel cell (PEM fuel cell), fuel or fuel molecules are split into protons and electrons at the anode. The membrane lets through the protons (for example, $H^+$), but it is not permeable to the electrons ($e^-$). At the anode the following reaction occurs: $2H_2 \rightarrow 4H^+ + 4e^-$ (oxidation/electron surrender). While the protons pass through the membrane to the cathode, the electrons are taken by an external circuit to the cathode or to an energy accumulator. Through cathode spaces inside the fuel cell stack 2 the cathodes can be supplied with cathode gas (such as oxygen or air containing oxygen), delivered by a compressor 21 and humidified by a humidifier 22, so that the following reaction occurs at the cathode side: $O_2 + 4H^+ + 4e^- \rightarrow 2H_2O$ (reduction/electron uptake).

Figure 2:
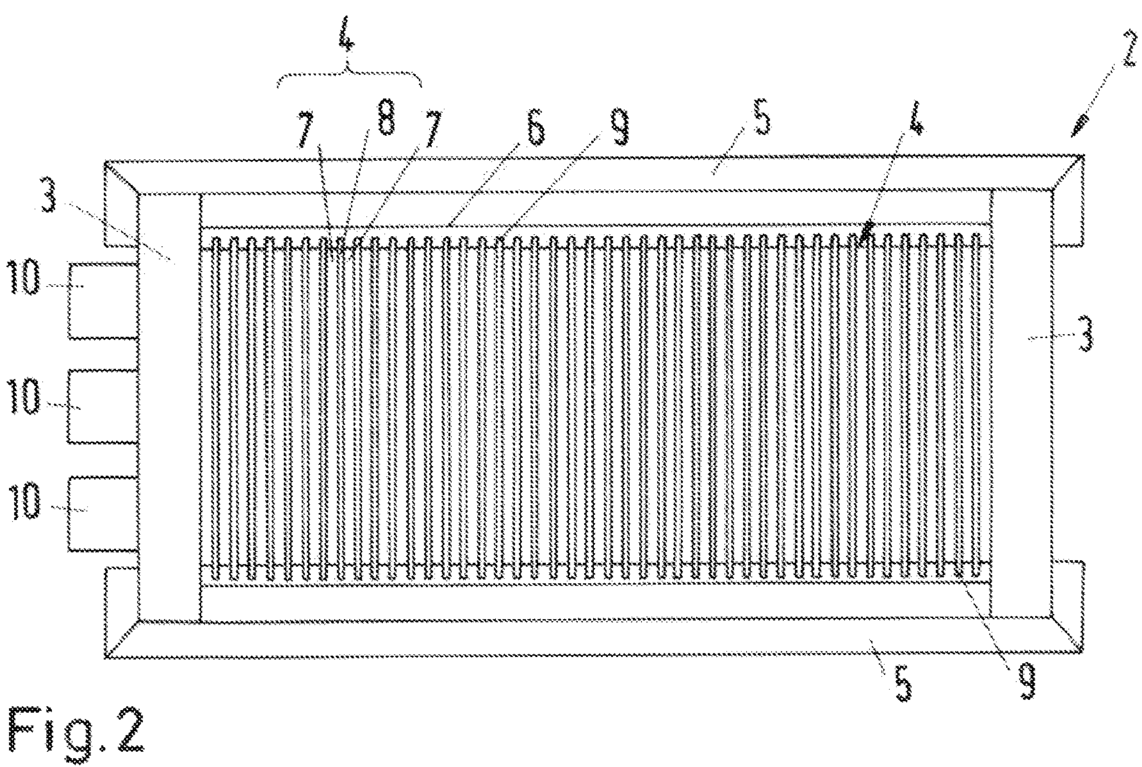
FIG. 2 shows a fuel cell stack having a cell series completely embedded in the casting material.

FIG. 2 shows a fuel cell stack 2 having a cell series composed of multiple unit cells 4, being formed with internal media guides in the cell, and contained between two clamped together end plates 3 in a fuel cell stack housing 5. Each of the unit cells 4 comprises two bipolar plates 7 and a membrane electrode assembly 8 contained between them. The end plates 3 are provided with connections 10 to supply the unit cells 4 with the operating media, being fluidically connected to the internal media guides in the cell. The cell series present in the fuel cell stack housing 5 is entirely embedded in an electrically insulating casting material 6; i.e., including the overhangs 9 present at the membrane electrode assemblies 8 or their frame or seal. It should be noted therefore in this place that the overhangs 9 themselves need not be part of the electrochemically active membrane electrode assemblies 8. These may be present on the frame enclosing the particular membrane electrode assembly 8, positively influencing the stability of the stack and additionally providing a lateral sealing. Because of the casting material 6, no ventilation of the fuel cell stack housing 5 is necessary, so that it does not feature a fan. In the embodiment shown, the casting material 6 is braced against the fuel cell stack housing 5, further improving the mechanical stability of the cell series. The casting material 6 may be formed from a material chosen from the group comprising thermoplastic urethane (TPU), ethylene propylene diene (monomer) (EPDM) rubber and chlorobutyl rubber.

Figure 3:
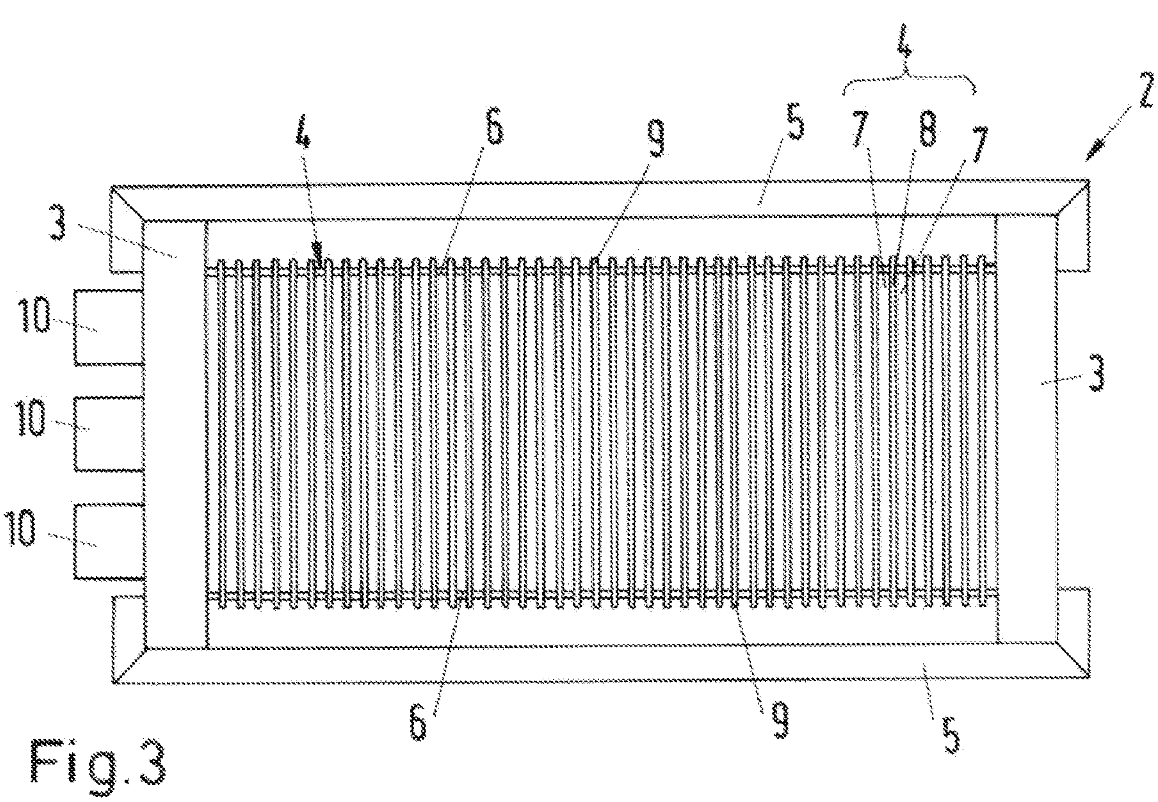
FIG. 3 shows a representation corresponding to FIG. 2 with an overhang of the MEA left free of the casting material.

FIG. 3 shows another fuel cell stack 2 in which the overhangs 9 of the frame of the membrane electrode assemblies 8 are not fully covered by the casting material 6, resulting in reduced overall weight of the stack. But here it is possible for the cell series to be completely embedded in the casting material 6, because the casting material 6 penetrates the overhangs 9 axially and completely and thus impregnates them.

On the whole, the fuel cell stack 2 described herein and the method described herein for producing a fuel cell stack 2 are characterized in that the cell series is embedded in an electrically insulating casting material 6, which seals it off against a gas exchange and reduces the cavities present in the stack housing.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell stack, comprising:

a cell series composed of multiple unit cells, being formed with internal media guides in the unit cells, and contained between two clamped together end plates in a fuel cell stack housing, wherein the cell series present in the fuel cell stack housing is embedded entirely in an electrically insulating casting material that extends completely between the two clamped together end plates and completely around a perimeter of each unit cell such that all sides of the unit cells are covered by the electrically insulating casting material, or wherein, apart from lateral overhangs of the unit cells, the cell series present in the fuel cell stack housing is embedded entirely in an electrically insulating casting material that extends completely between the two clamped together end plates and completely around a perimeter of each unit cell such that, apart from the lateral overhangs, all sides of the unit cells are covered by the electrically insulating casting material.

2. The fuel cell stack according to claim 1, wherein the electrically insulating casting material is braced against the fuel cell stack housing.

3. The fuel cell stack according to claim 1, wherein the electrically insulating casting material is chosen from the group comprising thermoplastic urethane (TPU), ethylene propylene diene (monomer) (EPDM) rubber or chlorobutyl rubber.

4. The fuel cell stack according to claim 1, wherein each of the unit cells comprise a membrane electrode assembly received between two bipolar plates, and a lateral overhang is provided, being formed on the membrane electrode assembly, on a frame encasing the membrane electrode assembly, or on a seal laterally encompassing the membrane electrode assembly.

5. The fuel cell stack according to claim 4, wherein the overhang is completely embedded in the electrically insulating casting material.

6. The fuel cell stack according to claim 4, wherein the overhang is only partly embedded in the electrically insulating casting material.

7. The fuel cell stack according to claim 1, wherein the fuel cell stack housing is closed air-tight.

8. The fuel cell stack according to claim 1, wherein the fuel cell stack housing does not feature a fan.

9. The fuel cell stack according to claim 1, wherein at least one of the end plates is provided with all connections for supplying the unit cells with operating media, which are fluidically connected to the internal media guides of the unit cells.

10. The fuel cell stack according to claim 1, whereby the electrically insulating casting material that extends completely between the two clamped together end plates and completely around the perimeter of each unit cell prevents any fluid from entering or exiting from the perimeter of the unit cells, or whereby the electrically insulating casting material that, apart from the lateral overhangs, extends completely between the two clamped together end plates and completely around the perimeter of each unit cell prevents any fluid from entering or exiting from the perimeter of the unit cells.

11. A method for producing a fuel cell stack including a cell series composed of multiple unit cells, being formed with internal media guides in the unit cells, and contained between two clamped together end plates in a fuel cell stack housing, wherein the cell series present in the fuel cell stack housing is embedded entirely in an electrically insulating casting material that extends completely between the two clamped together end plates and completely around a perimeter of each unit cell such that all sides of the unit cells are covered by the electrically insulating casting material, or wherein, apart from lateral overhangs of the unit cells, the cell series present in the fuel cell stack housing is embedded entirely in an electrically insulating casting material that extends completely between the two clamped together end plates and completely around a perimeter of each unit cell such that, apart from the lateral overhangs, all sides of the unit cells are covered by the electrically insulating casting material, the method comprising:

stacking of unit cells made from bipolar plates with membrane electrode assemblies situated between the bipolar plates, being provided with internal media guides in the unit cells, to form the cell series;

clamping the stacked unit cells between the two end plates in the fuel cell stack housing; and casting the cell series in the electrically insulating casting material, braced against the fuel cell stack housing.

12. The method according to claim 11, whereby the electrically insulating casting material that extends completely between the two clamped together end plates and completely around the perimeter of each unit cell prevents any fluid from entering or exiting from the perimeter of the unit cells, or whereby the electrically insulating casting material that, apart from the lateral overhangs, extends completely between the two clamped together end plates and completely around the perimeter of each unit cell prevents any fluid from entering or exiting from the perimeter of the unit cells.

* * * * *